US011398097B2

(12) United States Patent
Zhang et al.

(10) Patent No.: US 11,398,097 B2
(45) Date of Patent: Jul. 26, 2022

(54) TARGET DETECTION METHOD BASED ON FUSION OF PRIOR POSITIONING OF MILLIMETER-WAVE RADAR AND VISUAL FEATURE

(71) Applicant: BEIHANG UNIVERSITY, Beijing (CN)

(72) Inventors: Xinyu Zhang, Beijing (CN); Li Wang, Beijing (CN); Yilong Ren, Beijing (CN); Haiyang Yu, Beijing (CN); Rentao Sun, Beijing (CN); Zhiwei Li, Beijing (CN); Yunpeng Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/548,615

(22) Filed: Dec. 13, 2021

(65) Prior Publication Data
US 2022/0198806 A1 Jun. 23, 2022

(30) Foreign Application Priority Data
Dec. 21, 2020 (CN) .......................... 202011520256.7

(51) Int. Cl.
*G06T 7/00* (2017.01)
*G06V 20/56* (2022.01)
(Continued)

(52) U.S. Cl.
CPC ........... *G06V 20/56* (2022.01); *G06N 3/0445* (2013.01); *G06N 3/0454* (2013.01); *G06T 7/70* (2017.01);
(Continued)

(58) Field of Classification Search
CPC ........ G06V 20/56; G06V 10/40; G06V 10/80; G06N 3/0445; G06N 3/0454; G06T 7/70;
(Continued)

(56) References Cited

U.S. PATENT DOCUMENTS

2017/0300780 A1* 10/2017 Baba ..................... G01S 13/867
2017/0372149 A1* 12/2017 Mori ....................... G06T 7/277
(Continued)

FOREIGN PATENT DOCUMENTS

| CN | 107491731 A | 12/2017 |
|---|---|---|
| CN | 107609522 A | 1/2018 |

(Continued)

OTHER PUBLICATIONS

Study on Preceding Vehicle Detection at Night Based on Millimeter-Wave Radar-vision, Jilin University China, 2016, pp. 1-10.
(Continued)

*Primary Examiner* — Ping Y Hsieh
(74) *Attorney, Agent, or Firm* — Bayramoglu Law Offices LLC

(57) ABSTRACT

A target detection method based on the fusion of prior positioning of a millimeter-wave radar and a visual feature includes: simultaneously obtaining, based on the millimeter-wave radar and a vehicle-mounted camera after being calibrated, point cloud data of the millimeter-wave radar and a camera image; performing spatial 3D coordinate transformation on the point cloud data to project transformed point cloud data onto a camera plane; generating a plurality of anchor samples based on projected point cloud data according to a preset anchor strategy, and obtaining a final anchor sample based on a velocity-distance weight of each candidate region; fusing RGB information of the camera image and intensity information of an RCS in the point cloud data to obtain a feature of the final sample; and inputting the
(Continued)

feature of the final anchor sample into a detection network to generate category and position information of a target in a scenario.

12 Claims, 2 Drawing Sheets

(51) Int. Cl.
  *G06V 10/80* (2022.01)
  *G06V 10/40* (2022.01)
  *G06T 7/70* (2017.01)
  *G06N 3/04* (2006.01)

(52) U.S. Cl.
  CPC .............. *G06V 10/40* (2022.01); *G06V 10/80* (2022.01); *G06T 2207/10024* (2013.01); *G06T 2207/10044* (2013.01); *G06T 2207/20081* (2013.01); *G06T 2207/20084* (2013.01); *G06T 2207/30252* (2013.01)

(58) Field of Classification Search
  CPC . G06T 2207/10024; G06T 2207/10044; G06T 2207/20081; G06T 2207/20084; G06T 2207/30252
  See application file for complete search history.

(56) References Cited

U.S. PATENT DOCUMENTS

| | | | | |
|---|---|---|---|---|
| 2020/0298842 | A1* | 9/2020 | Takamatsu | B60W 30/09 |
| 2021/0053580 | A1* | 2/2021 | Horiguchi | G06V 20/56 |

FOREIGN PATENT DOCUMENTS

| | | |
|---|---|---|
| CN | 107817483 A | 3/2018 |
| CN | 109597087 A | 4/2019 |
| CN | 109885056 A | 6/2019 |
| CN | 110532896 A | 12/2019 |
| CN | 110751040 A | 2/2020 |
| CN | 111060904 A | 4/2020 |
| CN | 111144304 A | 5/2020 |
| CN | 111274976 A | 6/2020 |
| CN | 111709881 A | 9/2020 |
| WO | 2019145911 A2 | 8/2019 |

OTHER PUBLICATIONS

Zhang Xinyu, et al., Deep multi-modal fusion in object detection for autonomous driving, CAAI Transactions on Intelligent Systems, 2020, pp. 758-771, vol. 15, No. 4, China Academic Journal Electronic Publishing House.

Zhongtong Li, et al., Vehicle Object Detection Based on RGB-Camera and Radar Sensor Fusion, 2019 International Joint Conference on Information, Media and Engineering (IJCIME), 2019, pp. 164-169, IEEE.

Koyel Banerjee, et al., Online Camera LiDAR Fusion and Object Detection on Hybrid Data for Autonomous Driving, 2018 IEEE Intelligent Vehicles Symposium (IV), 2018, pp. 1632-1638, IEEE.

* cited by examiner

TARGET DETECTION METHOD BASED ON FUSION OF PRIOR POSITIONING OF MILLIMETER-WAVE RADAR AND VISUAL FEATURE

CROSS REFERENCE TO THE RELATED APPLICATIONS

This application is based upon and claims priority to Chinese Patent Application No. 202011520256.7, filed on Dec. 21, 2020, the entire contents of which are incorporated herein by reference.

TECHNICAL FIELD

The present invention relates to the technical field of autonomous driving, and more particularly, to a target detection method based on fusion of prior positioning of a millimeter-wave radar and a visual feature.

BACKGROUND

Target detection in a road scenario is a key technical procedure to perceive autonomous driving of a vehicle, so as to enable a driving perception system of the vehicle to determine a surrounding environment, avoid collision with another vehicle, a pedestrian and other targets, foresee implementation of an auxiliary decision-making system, and realize safe autonomous driving of the vehicle on a lane.

An autonomous-driving perception system can recognize a surrounding target in a current scenario by extracting a feature of a visual image obtained by a camera, which is similar to human perception by using a visual system. A target in a good visual environment can be easily recognized by people and vehicles. However, in a scenario with a bad visual environment such as strong light, fog, or night, it is limited to obtain information through human vision, and it is also difficult for the perception system of the vehicle to make correct recognition and judgment by only relying on visual information. In order to realize autonomous driving, accurate detection of a target on a road in all-weather scenarios needs to be realized. Therefore, many methods begin to use other information (for example, information obtained by a lidar, a millimeter-wave radar, and a thermal imager) to enhance a recognition capability of the perception system.

The millimeter-wave radar calculates a radial velocity of an object relative to the vehicle by using a Doppler effect. A point cloud of the millimeter-wave radar is not affected by a visible light environment, can distinguish targets of different materials and contains spatial information. Therefore, distance and velocity information fed back by the millimeter-wave radar is used to assist in determining an obstacle, so as to improve an obstacle avoidance capability of an autonomous vehicle, which has been widely used. However, the point cloud of the millimeter-wave radar is very sparse, and noise in the point cloud has a great impact on obstacle determining.

In a complex scenario, in order to a resolve a problem of low accuracy of detecting the target on the road by only using a vehicle-mounted camera or the millimeter-wave radar, a novel idea is proposed to fuse a plurality of types of information of sensors to improve a perception capability of a road environment around the vehicle. However, most of these methods directly perform feature fusion on information (intensity of a radar cross section (RCS), a radial velocity, a distance, and the like) fed back by the millimeter-wave radar and visual information of the vehicle-mounted camera without distinguishing them, and do not make full use of a complementary function of the two types of sensor data. After observation and experimental analysis, the intensity of the RCS has a certain correlation with a target material, and thus belongs a category-related attribute, while the distance and the velocity are category-independent attributes but space-related attributes. Therefore, different information needs to be fused in different manners to enable information of a plurality of sensors more comprehensively to achieve more robust detection.

SUMMARY

To overcome the shortcomings in the prior art, the present invention provides a target detection method that makes full use of multi-mode fusion of various types of information returned by a millimeter-wave radar and visual information. The method performs target detection by fusing a point cloud of the millimeter-wave radar and a camera image, uses the point cloud of the millimeter-wave radar to supplement spatial information of the image and enhance a semantic feature, uses the image to make up for a low sampling density of the point cloud, and uses fused information to enhance the robustness of a target detection algorithm based on the visual information in complex road scenarios such as rain, fog, and night.

To achieve the above objectives, Embodiment 1 of the present invention provides a target detection method based on the fusion of prior positioning of a millimeter-wave radar and a visual feature. The method includes:

simultaneously obtaining, based on the millimeter-wave radar and a vehicle-mounted camera after being calibrated, point cloud data of the millimeter-wave radar and a camera image, and performing spatial three-dimensional (3D) coordinate transformation on the point cloud data of the millimeter-wave radar to project transformed point cloud data onto a camera plane;

generating a plurality of anchor samples based on projected point cloud data of the millimeter-wave radar according to a preset anchor strategy, and obtaining a final anchor sample based on a velocity-distance weight of each candidate region;

fusing red-green-blue (RGB) information of the camera image and intensity information of an RCS in the point cloud data of the millimeter-wave radar to obtain a feature of the final sample; and inputting the feature of the final anchor sample into a detection network to generate category and position information of a target in a scenario.

In an improvement of the method, the step of generating the plurality of anchor samples based on the projected point cloud data of the millimeter-wave radar according to the preset anchor strategy, and obtaining the final anchor sample based on the velocity-distance weight of each candidate region specifically includes:

using the projected point cloud data of the millimeter-wave radar as a position prior, namely, an anchor generation point, where one anchor generation point generates M groups of basic anchors, each group of basic anchors includes M anchor samples with preset sizes and aspect ratios, and therefore, one anchor generation point generates M×N anchor samples;

respectively extracting velocity information and distance information in the point cloud data of the millimeter-wave radar of each anchor sample, and calculating the velocity-distance weight W of each candidate region according to the following formula:

$$W = \sum_{i=1}^{n} -\ln\left(\frac{\text{Distance}}{\alpha}\right) \cdot e^{-\frac{\text{Velocity}}{\beta} - \frac{\beta}{2}},$$

where $\alpha$ and $\beta$ are weight coefficients, $\alpha$ represents a maximum value of a maximum effective ranging scope of the millimeter-wave radar, and $\beta$ is determined based on a velocity of a vehicle on a road, such that $$-\frac{\text{Velocity}}{\beta} - \frac{\beta}{2} \in (0, 1)$$

and a finial weight meets $W \in (0,1)$; n represents a quantity of point clouds contained in one candidate region; Velocity represents the velocity information in the point cloud data of the millimeter-wave radar; and Distance represents the distance information in the point cloud data of the millimeter-wave radar; and performing scaling and derivation on the anchor samples comprehensively by using the velocity-distance weight to obtain the final anchor sample.

In an improvement of the method, the step of fusing the RGB information of the camera image and the intensity information of the RCS in the point cloud data of the millimeter-wave radar to obtain the feature of the final sample specifically includes:

representing the RGB information of the camera image as (R, G, B), and performing data standardization by using a Min-Max standardization method to obtain standardized image information (R', G', B'); and representing the intensity information of the RCS in the point cloud data of the millimeter-wave radar as RCS, using the RCS as information of a fourth channel, and fusing the information of the fourth channel and three-channel RGB information of the image to obtain four-channel information (R', G', B', RCS);

using RestNet50 as a feature extraction network, inputting the four-channel information into a pre-trained feature extraction network, and outputting a feature of four-channel information of an original image; and performing region mapping on the final anchor sample and the feature of the four-channel information of the original image to obtain the feature of the final anchor sample.

In an improvement of the method, the method further includes: training the feature extraction network, specifically including:

generating a dataset based on labeled point cloud data of the millimeter-wave radar and a labeled camera image;

setting an initial value of a learning rate lr to 0.001, and updating the learning rate according to a cosine annealing strategy, where a batch value b used for each parameter update is 64, and a quantity of iterative trainings, namely, epoch, is 300; and using a cross entropy loss function as a loss function, and performing parameter adjustment by using a gradient descent method until the feature extraction network converges.

In an improvement of the method, the detection network is a Faster-recurrent convolutional neural network (Faster-RCNN), and includes a positioning subnetwork and a regression subnetwork, where the positioning subnetwork positions the target, and the regression subnetwork classifies the target.

Embodiment 2 of the present invention provides a computer device, including a memory, a processor, and a computer program stored in the memory and executable on the processor, where when the processor executes the computer program, the above-mentioned method is implemented.

Embodiment 3 of the present invention provides a computer-readable storage medium, where a computer program is stored in the computer-readable storage medium, and when the computer program is executed by a processor, the processor executes the above-mentioned method.

Compared with the prior art, the present invention has the following advantages:

1. The method in the present invention fully fuses the point cloud of the millimeter-wave radar and the image obtained by the vehicle-mounted camera to make advantages of the two types of data complementary, and makes full use of a feature of information returned by the millimeter-wave radar to optimize an existing detection framework, thereby improving accuracy of target detection on a road in all-weather scenarios.

2. The method in the present invention not only uses radar information in a current frame to perform target positioning in a current visual field in advance, but also can use radar information in continuous frame data to perform correlative prior positioning on a target in a next frame, making the algorithm more robust and stable.

DETAILED DESCRIPTION OF THE EMBODIMENTS

In order to make the objectives, the technical solutions and the advantages of the present invention clearer, the present invention is further described in detail with reference to drawings and embodiments. It should be understood that the specific embodiments described herein are merely intended to explain the present invention, rather than to limit the present invention.

Embodiment 1

Figure 1:
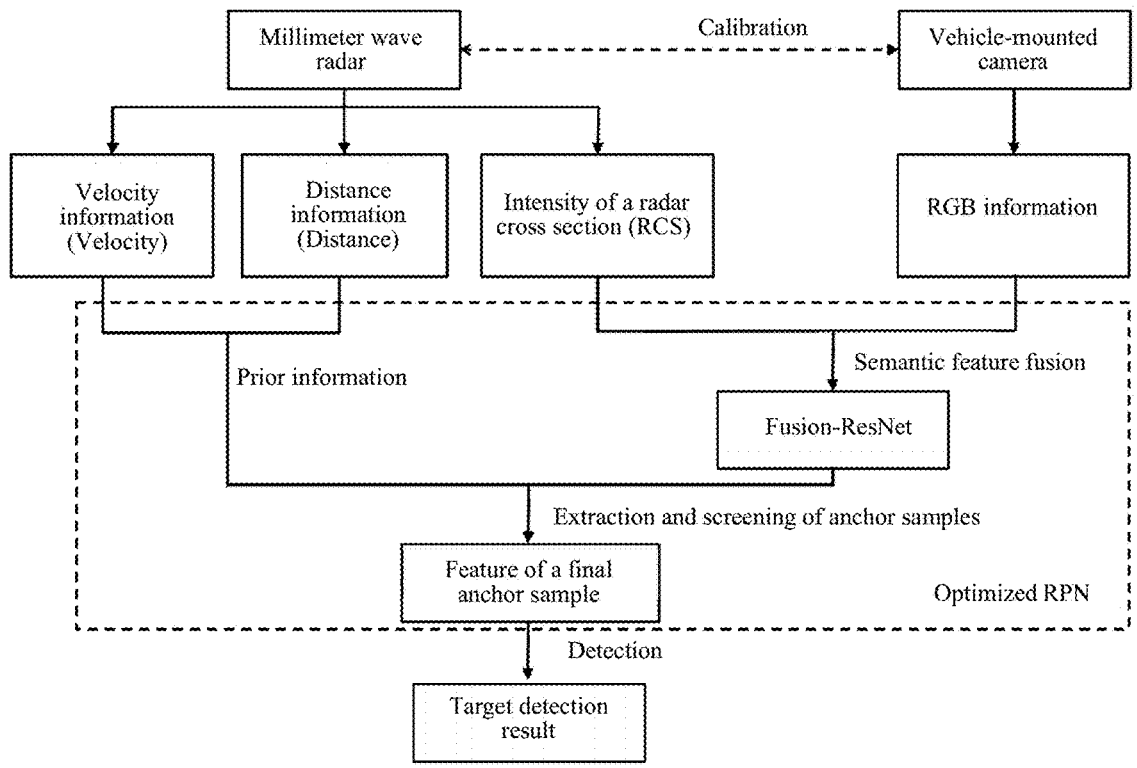
FIG. 1 is a flowchart of a target detection method based on the fusion of prior positioning of a millimeter-wave radar and a visual feature according to Embodiment 1 of the present invention.

As shown in FIG. 1, the present invention provides a target detection method based on the fusion of prior positioning of a millimeter-wave radar and a visual feature. The method includes the following steps:

Step 1): Simultaneously obtain, based on the millimeter-wave radar and a vehicle-mounted camera after being calibrated, point cloud data of the millimeter-wave radar and a camera image, and perform spatial 3D coordinate transformation on the point cloud data of the millimeter-wave radar to project transformed cloud data onto a camera plane.

Step 2): Generate a plurality of anchor samples based on projected point cloud data of the millimeter-wave radar according to a preset anchor strategy, and obtain a final anchor sample based on a velocity-distance weight of each candidate region. This step specifically includes the following substeps:

Step 2-1): Generate the plurality of anchor samples based on the point cloud data of the millimeter-wave radar and according to the preset anchor strategy.

Figure 2:
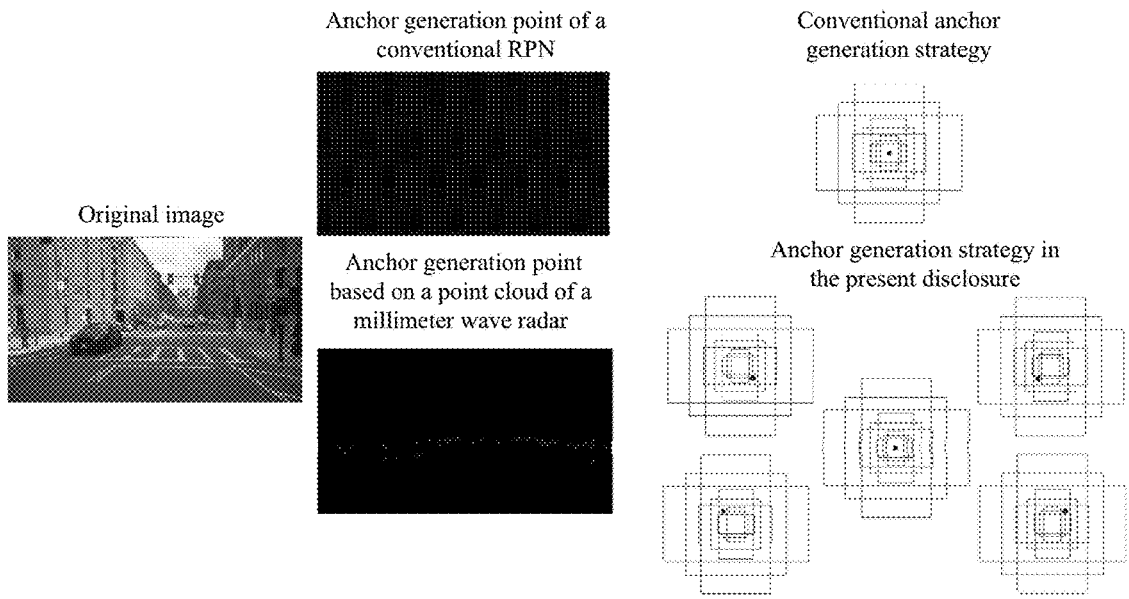
FIG. 2 is a schematic diagram of generating an anchor sample according to Embodiment 1 of the present invention.

As shown in FIG. 2, a conventional anchor generation strategy maps each point back to an original image based on a feature map to form anchor generation points evenly distributed in the image, and uses these points as a reference to generate an anchor with a preset size and ratio. However, the anchor strategy in the present invention uses the projected point cloud data of the millimeter-wave radar as a position prior, namely, an anchor generation point. One anchor generation point generates M groups of basic anchors, each group of basic anchors includes M anchor samples with preset sizes and aspect ratios, and one anchor generation point generates M×N anchor samples. In FIG. 2, M=5, and N=9.

Step 2-2): Respectively extract velocity information and distance information in the point cloud data of the millimeter-wave radar of each anchor sample, and calculate the velocity-distance weight W of each candidate region according to the following formula:

$$W = \sum_{i=1}^{n} -\ln\left(\frac{\text{Distance}}{\alpha}\right) \cdot e^{-\frac{\text{Velocity}}{\beta} - \frac{\beta}{2}},$$

In the above formula, α and β are weight coefficients, α represents a maximum value of a maximum effective ranging scope of the millimeter-wave radar, and β is determined based on a velocity of a vehicle on a road, such that $$-\frac{\text{Velocity}}{\beta} - \frac{\beta}{2} \in (0, 1)$$

and a finial weight meets W∈(0,1); n represents a quantity of point clouds contained in one anchor sample; Velocity represents the velocity information in the point cloud data of the millimeter-wave radar; and Distance represents the distance information in the point cloud data of the millimeter-wave radar.

A target close to a current vehicle and at a high speed can be considered as a target with a high risk coefficient. Fusing the two types of information to evaluate the candidate region can help to focus on learning the target with a high risk coefficient and improve safety of a perception system.

Step 2-3): Perform scaling and derivation on the anchor samples comprehensively by using the velocity-distance weight to obtain the final anchor sample.

A coefficient of the velocity-distance weight is calculated based on point cloud information at a corresponding position of the generated anchor sample. A target with a longer distance is more inclined to be smaller in a visual image, and more anchors need to be generated for a target with a higher speed to ensure that the target with a higher speed can be correctly detected. Therefore, scaling and derivation are performed on the anchor samples.

Step 3): Obtain a feature of the final anchor sample. This step specifically includes the following substeps:

Step 3-1): Extract intensity information of an RCS of a point cloud of the millimeter-wave radar, and fuse the intensity information of the RCS in the point cloud of the millimeter-wave radar and RGB information of the camera image. This step specifically includes the following steps:

3-1-1): Represent the RGB information of the camera image as (R, G, B), and perform data standardization by using a Min-Max standardization method to obtain standardized image information (R', G', B').

3-1-2): Represent intensity of the RCS in the point cloud as RCS.

3-1-3): Use the RCS as information of a fourth channel, and fuse the information of the fourth channel and three-channel RGB information of the image to obtain four-channel information (R', G', B', RCS).

Step 3-2): Use RestNet50 as a feature extraction network, input the four-channel information into RestNet50, and output a feature of four-channel information of the original image.

Figure 3:
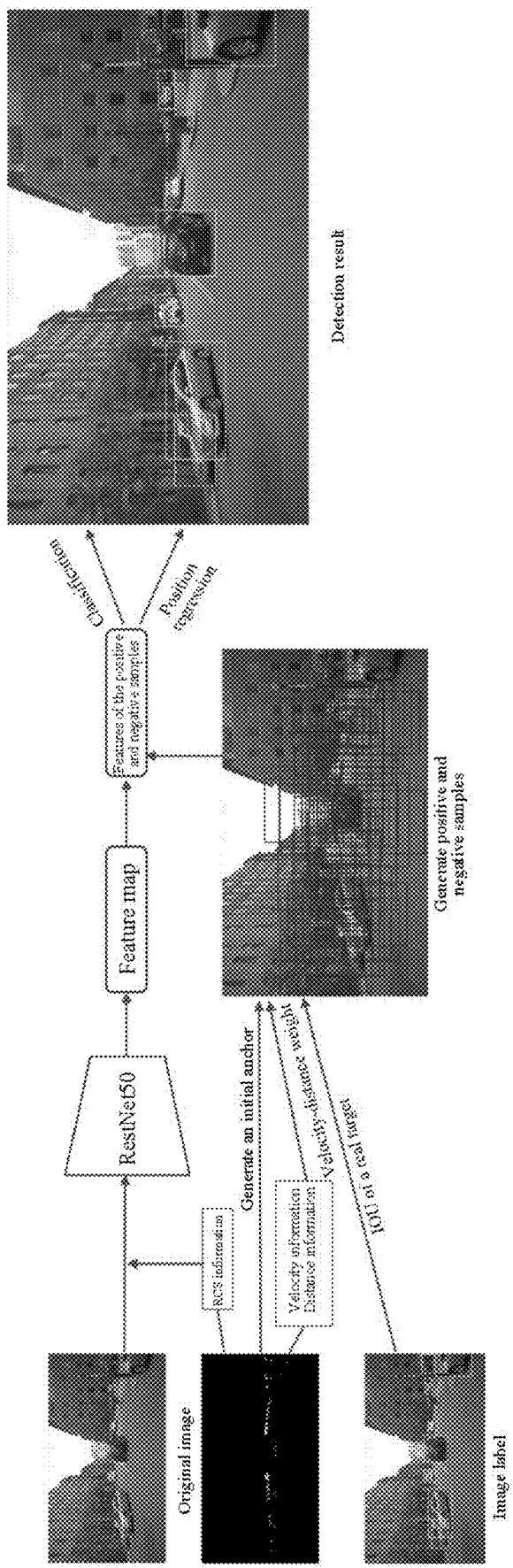
FIG. 3 is a schematic diagram of a target detection network based on prior positioning of a millimeter-wave radar according to Embodiment 1 of the present invention.

FIG. 3 shows a structure of a detection network in the present invention. Hardware and software platforms for constructing, training, and testing the network are Ubuntu16.04+TITAN RTX+Pytorch1.5+cuda10.0+cudn8.0+python3.6.

The network training mainly includes the following steps:

1) Dataset generation: Generate a dataset based on labeled point cloud data and a labeled image file.

2) Hyper-parameter setting: Set an initial value of a learning rate lr to 0.001. A batch value b used for each parameter update is 64, and a quantity of iterative trainings, namely, epoch, is 300.

3) Loss function setting: Use a conventional cross entropy loss function.

4) Learning rate update: Decrease the learning rate by using a cosine annealing strategy.

Step 3-3): Perform region mapping on the final anchor sample and the feature of the four-channel information of the original image to obtain the feature of the final anchor sample.

Step 4): Input the feature of the final anchor sample into the detection network to generate category and position information of a target in a scenario.

The detection network is a Faster-recurrent convolutional neural network (Faster-RCNN), and includes a positioning subnetwork and a regression subnetwork, where the positioning subnetwork positions the target, and the regression subnetwork classifies the target. The detection network also needs to be learned and trained in advance.

Embodiment 2 of the present invention provides a computer device, including at least one processor, a memory, at least one network interface, and a user interface. The components in the device are coupled together by using a bus system. It can be understood that the bus system is configured to realize connection and communication between these components. In addition to a data bus, the bus system also includes a power bus, a control bus, and a status signal bus. The user interface may include a display, a keyboard, or a click device (for example, a mouse, a track ball, a touch pad, or a touch screen).

It can be understood that the memory in this embodiment of the present invention may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. Through illustrative rather than restrictive description, RAMs of many forms are available, for example, a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DRRAM). The memory described in this specification is intended to include, but is not limited to, these memories and a memory of any other suitable type.

In some implementations, the memory stores the following elements, executable modules or data structures, or their subsets, or their extension sets: an operating system and application programs.

The operating system contains various system programs, for example, a framework layer, a core library layer, and a driver layer, for realizing various basic services and processing hardware-based tasks. The application programs include various application programs, for example, a media player and a browser, for realizing various application services. A program for implementing the method in the embodiments of the present invention may be included in the application programs.

In the above embodiment, the processor may further call a program or an instruction stored in the memory, specifically, a program or an instruction stored in the application programs, to execute the steps of the method in Embodiment 1.

The method in Embodiment 1 may be applied to the processor or implemented by the processor. The processor may be an integrated circuit (IC) chip capable of signal processing. During the implementation, the steps of the above method may be performed by using an integrated logic circuit of hardware in the processor or by using instructions in a form of software. The processor may alternatively be a general-purpose processor, a digital signal processor (DSP), an application-specific integrated circuit (ASIC), a field-programmable gate array (FPGA), another programmable logic device, a discrete gate or transistor logic device, a discrete hardware component, or the like. The processor can implement or execute the methods, steps and logical block diagrams disclosed in Embodiment 1 of the present invention. The general-purpose processor may be a microprocessor, any conventional processor, or the like. The steps of the method disclosed with reference to Embodiment 1 may be directly executed by a hardware decoding processor, or executed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory, and completes the steps of the above method in combination with hardware in the processor.

It can be understood that the embodiments described in the present invention may be implemented by hardware, software, firmware, microcode or a combination thereof. For implementation by the hardware, a processing unit can be implemented in one or more application-specific integrated circuits (ASICs), digital signal processors (DSPs), digital signal processing devices (DSPDs), programmable logic devices (PLDs), field-programmable gate arrays (field programmable gate array, FPGAs), general-purpose processors, controllers, microcontrollers, microprocessors, other electronic units for performing the functions described in the present invention, or a combination thereof.

For implementation by the software, the present invention can be implemented by executing the functional modules (for example, a procedure and a function) in the present invention. The software code may be stored in the memory and executed by the processor. The memory may be implemented in the processor or outside the processor.

Embodiment 3

Embodiment 3 of the present invention provides a non-volatile storage medium for storing a computer program. When the computer program is executed by a processor, the steps of the above method in Embodiment 1 can be implemented.

The present invention has the following innovation points:

1. Similar to a conventional two-stage target detection network, a feature network is used to extract the semantic feature. A conventional region proposal network (RPN) generates a preset anchor based on each point of the feature map to form the final anchor sample. To accelerate this process, the present invention uses the RPN to generate the feature of the final anchor sample based on the point cloud of the millimeter-wave radar.

2. The anchor sample in the present invention needs to be determined based on the velocity-distance weight, which is different from that in the conventional RPN. More anchor samples are generated for a target with a high speed and a short distance and a target with a long distance, to improve detection of a high-speed target and a small target, and improve overall detection accuracy.

3. The three features of the conventional ResNet50 network are fused with the intensity information of the RCS, and a fused feature is used for learning.

4. For different radar information, corresponding radar point cloud images are generated. Attributes of the point cloud are the intensity of the RCS, the radial velocity (Velocity) and the distance (Distance). The intensity of the RCS of the millimeter-wave radar varies with different types of targets. The present invention optimizes region of interest (ROI) extraction of the detection algorithm by fusing the velocity and distance information of the millimeter-wave radar, generates the anchor sample based on prior information of the point cloud of the millimeter-wave radar, selects and optimizes the anchor sample based on fused information of the velocity and distance of the radar point cloud, and improves quality of an initial extraction region, so as to improve a convergence speed and final detection accuracy of the network.

5. The RPN of the two-stage detection network based on the Faster RCNN is used to extract an image feature, and improves the feature by fusing the intensity of the RCS, so as to learn the semantic feature in the case of poor visual visibility.

Finally, it should be noted that the above embodiments are only used to explain the technical solutions of the present invention, and are not intended to limit the same. Although the present invention is described in detail with reference to the embodiments, those of ordinary skill in the art should understand that various modifications or equivalent substitutions may be made to the technical solutions of the present invention without departing from the spirit and scope of the technical solutions of the present invention, and such modifications or equivalent substitutions should fall within the scope of the claims of the present invention.

What is claimed is:

1. A target detection method based on fusion of prior positioning of a millimeter-wave radar and a visual feature, comprising:

simultaneously obtaining, based on the millimeter-wave radar and a vehicle-mounted camera after being calibrated, point cloud data of the millimeter-wave radar and a camera image, and performing spatial three-dimensional (3D) coordinate transformation on the point cloud data of the millimeter-wave radar to project transformed point cloud data onto a camera plane;

generating a plurality of anchor samples based on projected point cloud data of the millimeter-wave radar according to a preset anchor strategy, and obtaining a final anchor sample based on a velocity-distance weight of each candidate region;

fusing red-green-blue (RGB) information of the camera image and intensity information of a radar cross section (RCS) in the point cloud data of the millimeter-wave radar to obtain a feature of the final anchor sample; and inputting the feature of the final anchor sample into a detection network to generate category and position information of a target in a scenario;

wherein the step of generating the plurality of anchor samples based on the projected point cloud data of the millimeter-wave radar according to the preset anchor strategy, and obtaining the final anchor sample based on the velocity-distance weight of each candidate region specifically comprises:

using the projected point cloud data of the millimeter-wave radar as a position prior, namely, an anchor generation point, wherein one anchor generation point generates M groups of basic anchors, and each group of basic anchors comprises N anchor samples with preset sizes and aspect ratios, wherein one anchor generation point generates N×N anchor samples;

respectively extracting velocity information and distance information in the point cloud data of the millimeter-wave radar of each anchor sample, and calculating the velocity-distance weight W of each candidate region according to the following formula:

$$W = \sum_{i=1}^{n} -\ln\left(\frac{\text{Distance}}{\alpha}\right) \cdot e^{-\frac{\text{Velocity}}{\beta} - \frac{\beta}{2}},$$

wherein α and β are weight coefficients, α represents a maximum value of a maximum effective ranging scope of the millimeter-wave radar, and β is determined based on a velocity of a vehicle on a road, wherein $$-\frac{\text{Velocity}}{\beta} - \frac{\beta}{2} \in (0, 1)$$

and a finial weight meets W∈(0,1); n represents a quantity of point clouds contained in one candidate region;

Velocity represents the velocity information in the point cloud data of the millimeter-wave radar; and Distance represents the distance information in the point cloud data of the millimeter-wave radar; and performing scaling and derivation on the anchor samples comprehensively by using the velocity-distance weight to obtain the final anchor sample.

2. The target detection method based on the fusion of the prior positioning of the millimeter-wave radar and the visual feature according to claim 1, wherein the step of fusing the RGB information of the camera image and the intensity information of the RCS in the point cloud data of the millimeter-wave radar to obtain the feature of the final anchor sample specifically comprises:

representing the RGB information of the camera image as (R, G, B), and performing data standardization by using a Min-Max standardization method to obtain standardized image information (R', G', B'); and representing the intensity information of the RCS in the point cloud data of the millimeter-wave radar as RCS, using the RCS as information of a fourth channel, and fusing the information of the fourth channel and three-channel RGB information of the camera image to obtain four-channel information (R', G', B', RCS);

using RestNet50 as a feature extraction network, inputting the four-channel information into a pre-trained feature extraction network, and outputting a feature of four-channel information of an original image; and performing region mapping on the final anchor sample and the feature of the four-channel information of the original image to obtain the feature of the final anchor sample.

3. The target detection method based on the fusion of the prior positioning of the millimeter-wave radar and the visual feature according to claim 2, further comprising: training the feature extraction network, specifically comprising:

generating a dataset based on labeled point cloud data of the millimeter-wave radar and a labeled camera image;

setting an initial value of a learning rate lr to 0.001, and updating the learning rate according to a cosine annealing strategy, wherein a batch value b used for each parameter update is 64, and a quantity of iterative trainings, namely, epoch, is 300; and using a cross entropy loss function as a loss function, and performing parameter adjustment by using a gradient descent method until the feature extraction network converges.

4. The target detection method based on the fusion of the prior positioning of the millimeter-wave radar and the visual feature according to claim 3, wherein the detection network is a Faster-recurrent convolutional neural network (Faster-RCNN), and the detection network comprises a positioning subnetwork and a regression subnetwork, wherein the positioning subnetwork positions the target, and the regression subnetwork classifies the target.

5. A computer device, comprising a memory, a processor, and a computer program stored in the memory and executable on the processor, wherein when the processor executes the computer program, the target detection method according to claim 1 is implemented.

6. The computer device according to claim 5, wherein the step of fusing the RGB information of the camera image and the intensity information of the RCS in the point cloud data of the millimeter-wave radar to obtain the feature of the final anchor sample specifically comprises:

representing the RGB information of the camera image as (R, G, B), and performing data standardization by using a Min-Max standardization method to obtain standardized image information (R', G', B'); and representing the intensity information of the RCS in the point cloud data of the millimeter-wave radar as RCS, using the RCS as information of a fourth channel, and fusing the information of the fourth channel and three-channel RGB information of the camera image to obtain four-channel information (R', G', B', RCS);
using RestNet50 as a feature extraction network, inputting the four-channel information into a pre-trained feature extraction network, and outputting a feature of four-channel information of an original image; and
performing region mapping on the final anchor sample and the feature of the four-channel information of the original image to obtain the feature of the final anchor sample.

7. The computer device according to claim 6, wherein the target detection method further comprises: training the feature extraction network, specifically comprising:
generating a dataset based on labeled point cloud data of the millimeter-wave radar and a labeled camera image;
setting an initial value of a learning rate lr to 0.001, and updating the learning rate according to a cosine annealing strategy, wherein a batch value b used for each parameter update is 64, and a quantity of iterative trainings, namely, epoch, is 300; and
using a cross entropy loss function as a loss function, and performing parameter adjustment by using a gradient descent method until the feature extraction network converges.

8. The computer device according to claim 7, wherein the detection network is a Faster-recurrent convolutional neural network (Faster-RCNN), and the detection network comprises a positioning subnetwork and a regression subnetwork, wherein the positioning subnetwork positions the target, and the regression subnetwork classifies the target.

9. A computer-readable storage medium, wherein a computer program is stored in the computer-readable storage medium, and when the computer program is executed by a processor, the processor executes the target detection method according to claim 1.

10. The computer-readable storage medium according to claim 9, wherein the step of fusing the RGB information of the camera image and the intensity information of the RCS in the point cloud data of the millimeter-wave radar to obtain the feature of the final anchor sample specifically comprises:
representing the RGB information of the camera image as (R, G, B), and performing data standardization by using a Min-Max standardization method to obtain standardized image information (R', G', B'); and representing the intensity information of the RCS in the point cloud data of the millimeter-wave radar as RCS, using the RCS as information of a fourth channel, and fusing the information of the fourth channel and three-channel RGB information of the camera image to obtain four-channel information (R', G', B', RCS);
using RestNet50 as a feature extraction network, inputting the four-channel information into a pre-trained feature extraction network, and outputting a feature of four-channel information of an original image; and
performing region mapping on the final anchor sample and the feature of the four-channel information of the original image to obtain the feature of the final anchor sample.

11. The computer-readable storage medium according to claim 10, wherein the target detection method further comprises: training the feature extraction network, specifically comprising:
generating a dataset based on labeled point cloud data of the millimeter-wave radar and a labeled camera image;
setting an initial value of a learning rate lr to 0.001, and updating the learning rate according to a cosine annealing strategy, wherein a batch value b used for each parameter update is 64, and a quantity of iterative trainings, namely, epoch, is 300; and
using a cross entropy loss function as a loss function, and performing parameter adjustment by using a gradient descent method until the feature extraction network converges.

12. The computer-readable storage medium according to claim 11, wherein the detection network is a Faster-recurrent convolutional neural network (Faster-RCNN), and the detection network comprises a positioning subnetwork and a regression subnetwork, wherein the positioning subnetwork positions the target, and the regression subnetwork classifies the target.

* * * * *